United States Patent [19]

Drieling

[11] Patent Number: 5,081,936
[45] Date of Patent: Jan. 21, 1992

[54] COMPRESSIBLE DESK ARRANGEMENTS

[76] Inventor: Gerald L. Drieling, 1300 W. Medicine Lk. Dr., #120, Plymouth, Minn. 55441

[21] Appl. No.: 440,870

[22] Filed: Nov. 22, 1989

[51] Int. Cl.⁵ .............................................. A47B 23/00
[52] U.S. Cl. .......................................... 108/43; 108/25
[58] Field of Search ................ 108/43, 34, 35; 297/159, 199; 206/561; 248/444; 211/153

[56] References Cited

U.S. PATENT DOCUMENTS

| | | | |
|---|---|---|---|
| 130,094 | 7/1872 | White et al. | 108/43 |
| 2,640,747 | 6/1953 | Bodenhoff | 108/43 X |
| 3,701,576 | 10/1972 | Moen | 108/43 X |
| 4,052,944 | 10/1977 | Jennings | 108/43 |
| 4,193,351 | 3/1980 | Belokin, Jr. | 108/59 |
| 4,223,945 | 9/1980 | Niritits | 108/34 X |
| 4,235,472 | 11/1980 | Sparks | 108/43 X |
| 4,312,507 | 1/1982 | Smith et al. | 108/25 X |
| 4,570,410 | 2/1986 | Tuneke et al. | 108/27 X |
| 4,872,723 | 10/1989 | Kopf | 108/44 |

Primary Examiner—Peter A. Aschenbrenner
Attorney, Agent, or Firm—Merchant, Gould, Smith, Edell, Welter & Schmidt

[57] ABSTRACT

A desk arrangement is provided that includes a laterally compressible desk top portion with an upper surface sufficiently adapted to support writing activity thereon. Preferred embodiments of the desk arrangement include a desk top portion that is also resilient. Typically, and preferably, the desk arrangements are composed of a flexible cellular plastic material having at least an upper surface coated with a flexible elastomeric skin.

14 Claims, 6 Drawing Sheets fig. 1 fig. 2 fig. 3 fig. 4 fig. 5 fig. 6 fig. 7 fig. 8 fig. 9 fig. 10 fig. 11 fig. 12 fig. 13 fig. 14 fig. 15 fig. 16

COMPRESSIBLE DESK ARRANGEMENTS

FIELD OF THE INVENTION

The present invention concerns desk arrangements. More specifically it concerns compressible desk arrangements, as for example lap desks adapted for use by passengers of moving vehicles.

BACKGROUND OF THE INVENTION

Various arrangements for providing portable working surfaces are known and commonly used. Many of these arrangements are configured for use by persons while sitting, and may be referred to as lap-oriented working surfaces such as lap-top desks. Such arrangements include lap trays, boards, tables, and similar objects.

Lap desks provide convenient and portable surfaces, and are particularly useful in situations in which a working surface is desired but a typical desk is not convenient or available. For example, lap desks are desirable for use in cars, trains, or during airplane travel. They are also convenient and desirable for use by those who are confined to a bed or wheelchair, or for persons who prefer working on a portable surface.

One particularly useful application for lap desks, is to facilitate entertainment of children in a variety of situations, especially while traveling. Reasons for this include that the lap desk provides a flat surface for the user upon which to read, write, or draw during what may otherwise be a long and/or tedious period of time.

Conventional lap desks generally consist of a structure including a top comprising a flat, hard, rigid, and dense working surface, typically made of wood, metal, hard plastic, or the like. This surface is usually attached to a pedestal portion, or supporting structure, for positioning in the user's lap, typically on the user's legs. A variety of supporting structures have been used, including ones constructed of wire or hard materials similar to the materials used in the construction of the working surface. Some conventional arrangements have utilized soft cushions, and the like, as the pedestal portion in an effort to facilitate comfort of the user.

In addition to hard surfaces, some of these desks have hard and/or sharp edges and corners and possible pinch points. Because of these hard and/or sharp surfaces, edges, and corners, conventional lap desks are not completely satisfactory, at least for use in certain situations. Lap desks are popular for use by children, particularly in automobiles, and also by physically challenged people, particularly those confined to wheelchairs. Generally, however, these desks are heavy and bulky, which can make them difficult to adapt to restrictive spaces, such as a wheelchair, while in use, or while in storage.

Furthermore, at least because lap desks are often used while in a moving vehicle, a hard desk can be transformed into a particularly hazardous projectile in the event of a collision or sudden stop. Even if the desk were secured to prevent this, the hard surface poses a significant hazard, for example, if a portion of the user's body were violently thrown against the desk. The desk could also be a dangerous object in the event of a sudden stop or collision if it were secured in place, as for example, to the body of the user.

Therefore, what has been needed is a portable working surface, i.e., a lap desk, with a surface that is capable of supporting writing, drawing, coloring, or other similar activities, but is sufficiently soft so as to be appropriately compressible under circumstances that could be envisioned to otherwise be more hazardous if the surface were made of a hard and rigid material. That is, what is needed is a portable desk with a top portion that is firm yet soft, such that it is compressible, for example, upon impact. Preferably, it is compressible in a lateral direction. By this, it is not meant that a desk must be fully compressible, or necessarily fully collapsible, such as for storage. Rather, the desk should be sufficiently compressible so that when subjected to situations that could be envisioned to cause bodily injury or property damage, the desk's construction would typically lessen the likelihood and/or severity of the injury or damage.

Also, what has been needed is a lap desk that is flexible and lightweight and contains a functional surface. Flexibility would allow for the desk to conform to restrictive and confining spaces. A portable working surface with these characteristics would be advantageous for use by persons in a confined situation with limited space, as for example, a physically challenged person confined to a wheelchair. In this situation a desk is needed that easily conforms to various constructions of wheelchairs, while allowing normal use. Furthermore, a lightweight desk would be more comfortable while in use, it would allow for more widespread use by small children, elderly persons, those not fully capable of lifting relatively heavy or bulky objects, and those not able to readily tolerate a heavy desk on their laps. Also, a lightweight desk produces lesser forces in the event of it becoming a projectile. Lightweight and compressible desks are desirable where ease of transport and storage are valued. Desks that lack sharp edges and pinch points are also desirable.

OBJECTS OF THE INVENTION

The objects of the present invention include the provision of a desk arrangement comprising a laterally compressible desk top portion. The desk top portion is sufficiently firm to facilitate writing activities thereon. By means of such a construction, the desk arrangement is preferred for use as, for example, a lap desk by a passenger in a moving vehicle. Other objects and advantages to the present invention will be apparent from the following descriptions taken in connection with the accompanying drawings, which are set forth below by way of illustration and example of certain embodiments of this invention.

SUMMARY OF THE INVENTION

According to the present invention a desk arrangement is provided that comprises a laterally compressible desk top portion with an upper surface sufficiently adapted to support writing activity thereon. By "laterally compressible" and variants thereof it is meant that the desk top portion will substantially collapse under significant stress or force directed against an outer periphery thereof. With respect to this definition, the periphery does not refer to the upper or lower surfaces. That is, a stress or force directed against a side or side edge of the desk top portion will generally cause the desk top portion to be deformed.

In preferred embodiments, the desk top portion is also resilient. By this it is meant that the desk top portion is formed from a material that will compress with respect to laterally directed stress, and it will rebound from that stress substantially to its original configuration, once the laterally compressive stress is removed.

Herein, a desk arrangement is referred to as being "resilient" if it rebounds to at least about 95% of its original size from about a 10% compression. More preferably, it rebounds to greater than 99% of its original size from about a 10%, and typically somewhat greater, compression. Herein, for a preferred embodiment, upon referring to the desk top portion and its periphery, reference is being made to a generally rectangular construction having a front wall, a back wall, and two opposite side walls. By "generally" rectangular it is meant, for example, that the walls are not necessarily flat, and that opposite walls are not necessarily parallel. It is understood, however, that desk top portions that are generally shaped other than rectangular are also within the scope of the present invention.

A variety of materials may be used to form laterally compressible desk top portions, including flexible cellular plastic materials, such as crosslinked polyethylene foams or crosslinked polyolefin copolymer foams, and certain fibrous materials, such as fiberglass, and the like. Herein, the term "cellular plastic material" generically refers to cellular polymers, foamed plastics, expanded plastics, or plastic foams containing two-phase gas-solid systems in which the solid is continuous and composed of a synthetic polymer or rubber. Typically, a "flexible" foam material, as opposed to a rigid structural foam, is one that, according to ASTM (American Society for Testing and Materials) testing procedure no. D1056, incorporated herein by reference, does not rupture when a 20×2.5×2.5 cm piece is wrapped around a 2.5 cm mandrel at a uniform rate of 1 lap per 5 seconds at 15° C. to 25° C. The term "fibrous material" herein refers to any material that contains a network of fibers or threads.

In some applications it will be preferable to provide the laterally compressible material with an outer sheath, skin, or covering. Such coverings may include, for example, fabric covering or thermoplastic resins laminated to or otherwise affixed to the desk top portion. In preferred embodiments, as described in detail below, the desk top portion comprises a flexible cellular plastic material with at least an upper surface coated with a flexible elastomeric skin, i.e., a relatively dense layer with respect to the flexible cellular plastic. Such a material is, for example, a thermoplastic resinous rubber. The coating is typically and preferably about 5 to 40 mils (0.3 to 1.0 mm) thick, and more preferably about 7 to 14 mils (0.2 to 0.4 mm) thick. The preferred flexible elastomeric coating may be characterized by an elongation of about 300% to 700%, and a hardness of about 55 to 75 durometer hardness on the A scale.

As indicated above, desk top portions according to the present invention include an upper surface adapted to support writing activities or the like thereon. By this, it is meant that the upper surface of the preferred desk top portion is sufficiently resistive to compression by point pressure, such that normal activities conducted on the surface of a desk can be supported thereon without substantial need for an intervening hard surface such as a writing board or the like. Alternately stated, the preferred desk top portion upper surface is adapted to sufficiently resist compression from the point pressure of a writing utensil, such as a pen or pencil, during a writing activity involving placement of paper on the desk top, without substantial intervening support structure between the desk top portion and the paper. Preferably, however, the desk top portion will also substantially collapse under significant stress directed against the upper and/or lower surfaces of the desk arrangement. That is, a substantial stress may be directed against any surface or edge of the desk arrangement and advantageous compression will result, however, the upper surface, i.e., writing surface, will be particularly resistent to point pressure of the type usually associated with writing, sketching, or coloring.

A preferred material of construction is a flexible cellular plastic material. Preferred flexible cellular plastic materials generally possess a compression deflection, i.e., compression strength, within a range of about 0.2 to 35 psi (0.014 to 2.38 atm) at 25%. This is a measure of the force necessary to indent the material by about 25% of its original size at room temperature. More preferably, the compression deflection is within a range of about 1 to 10 psi (0.068 to 0.68 atm) at 25%.

The flexible cellular plastic material may be either "open" or "closed" cell material. Open cell material consists of cells that are not typically enclosed by their walls; i.e., there is interconnection between the cells. Conversely, closed cell materials consist of cells that are typically enclosed by their walls and hence do not generally interconnect with other cells. Either open cell or closed cell material is useable in the construction of preferred embodiments of the compressible desk arrangements of the present invention. Of the two types, closed cell material is generally preferred for reasons that will be discussed below. Depending on the material chosen, the upper surface may be treated in a variety of ways such that the surface is sufficiently adapted for supporting writing activities, as well as other activities typically carried out at a desk.

It will be understood that a variety of means may be utilized to provide for adaptation of the desk top portion upper surface to support writing activities thereon. For the embodiment described above, a sufficiently firm foam structure (coated or uncoated) was described. It will be understood that sufficient resistance can be provided not only by the firmness of the cellular material, e.g., foam, but also by the firmness generated upon application of a relatively dense yet flexible elastomeric material, such as thermoplastic resinous rubber or the like, to the foam to form a skin.

Alternately, in certain preferred embodiments the characteristics of the surface that allow for point pressure due to writing activities may be provided as a result of the processing of the flexible cellular plastic material. That is, certain cellular materials are manufactured such that at least one surface of the material has a relatively higher density than the other surfaces and is better adapted for writing thereon. Furthermore, a support structure may be incorporated within the desk or on the desk top portion, to facilitate the writing activity. For example, a thin film of a relatively high density flexible plastic material may be utilized as means to generate adaptation of the upper surface to support writing activities. Preferably, such a film would be of a thickness that does not significantly reduce the lateral compressibility of the desk top portion. It is preferably within a range of about 1 to 20 mils (0.025 to 0.5 mm) thick, and more preferably within a range of about 3 to 9 mils (0.08 to 0.2 mm). Preferred high density flexible plastic materials are characterized by an elongation of within a range of about 100% to 400%, and an ultimate strength of 24,000 to 30,000 psi (1,633 to 2,041 atm). An example of such a material is the plastic film available under the tradename MYLAR ™.

In certain preferred embodiments of the present invention, the desk top portion is provided with an elongated retaining trough or the like, for receipt of articles such as writing utensils therein. This provides advantageous operation because it provides temporary storage of writing utensils during desk use. Preferably, the trough is oriented such that retained writing utensils or the like extend between side edges of the desk top portion. An advantage of this is realized if the desk top portion were to collapse between a user and a structure such as a vehicle wall or car seat, the writing utensils would be less likely to become oriented as "spears" with respect to the desk user.

Furthermore, in certain preferred embodiments of the present invention, the desk top portion is provided with an annular receptacle for receipt of articles such as beverage containers therein. This provides advantageous operation if the desks are used as eating trays. This receptacle will generally reduce the incidence of spilling beverages during normal activity and use.

Preferably, the desk top portion includes an outer periphery defining a generally concave front wall. A concave front wall facilitates comfort of a user in close quarters such as in an automobile or the like. Further, a concave front wall, generally conforming to the waist area of a user's body, facilitates distribution of pressure should a sufficient lateral force be applied to the periphery of the desk top portion to collapse it.

In preferred embodiments the desk top portion is supported on a pedestal portion. Preferably the pedestal portion comprises compressible material so that it will collapse, under appropriate stress, during use. That is, the pedestal portion will substantially collapse under significant stress directed against it. In preferred embodiments, the pedestal portion is also resilient. By this it is meant that the pedestal portion is preferably formed from a material that will compress and will also rebound from that stress substantially to its original configuration, once the compressive stress is removed. Herein, the pedestal portion is referred to as being resilient if it rebounds substantially completely from about a 10%, and usually greater, compression. For certain embodiments, the pedestal portion is made of the same material as the desk top portion, whereas in others the materials may not be the same. For example, the desk top portion may be composed of closed cell material and the pedestal portion may be composed of open cell material.

In other preferred embodiments, a desk arrangement consists of a pedestal portion that is constructed and arranged to operatively support the desk top portion with its upper surface slanted downwardly from a back wall to a front wall. The front wall is that which is closest to the user in typical operation, i.e., it is that wall which is operatively placed against the stomach of the user. This arrangement facilitates use.

In other preferred embodiments described in detail below, the pedestal portion includes a lower surface defining first and second, concave, leg-receiving recesses. This, it will be understood, facilitates stability of the desk arrangement on the lap of the user, as well as comfort to the user.

In some preferred embodiments the desk arrangement is provided hollow, i.e., contains at least one internal cavity. This facilitates not only light weight construction and lower cost, but also collapse. Further, as will be understood from the detailed description, certain preferred manufacturing techniques lead to such a structure.

In one preferred embodiment shown in the drawings, the pedestal portion defines an internal storage recess, and the desk top portion is oriented as a removable cover to the recess. Preferably, for such an embodiment the desk top portion is hingedly secured to the pedestal portion, to facilitate opening and closing of the recess. The recess may be utilized in a variety of manners, including as temporary storage. The storage recess may be defined by the pedestal portion itself. Alternately, the internal storage recess may be more uniformly designed, as for example by the use of an internal layer of a flexible cellular plastic material.

For the particular embodiment with a recess wherein the top portion is hingedly secured to the pedestal portion, preferably closure means are provided to selectively retain the top portion in a covering relationship relative to the recess in the pedestal portion. A variety of closure means may be utilized, including a hook and loop fastener arrangement such as VELCRO TM, and the like.

For certain preferred embodiments of desk arrangements according to the present invention, the desk top portions are inflatable, as well as laterally compressible, resilient, and adapted to support writing activity thereon. By this it is meant that the desk top portion may be alternately inflated to a useable form and collapsed by removing at least a portion of the air contained therein, so that when deflated the desk arrangement advantageously occupies a smaller volume.

For some applications, the inflatable desk arrangements are preferably self-inflatable, so that upon opening an air entry valve, air enters the desk arrangement and expands the desk to its appropriate shape and size upon equalization of the pressure inside and outside the desk top portion. Such inflatable arrangements are preferably constructed using open cell flexible plastic material. To provide for an airtight enclosure the material is completely covered with a fabric, a flexible elastomeric skin, or a combination of both. The fabric, pretreated such that it is airtight, or the flexible elastomeric skin can provide the necessary upper surface that supports writing activities. Alternately, the upper surface may be treated in a variety of manners as described previously. For example, the open cell flexible plastic material may be completely enclosed by a pretreated fabric and additionally have an upper surface coated with a flexible elastomeric skin. Certain inflatable desk arrangements also include a pedestal portion, which could also and advantageously be made inflatable.

The drawings constitute part of this specification and include exemplary embodiments. It will be understood that in the drawings relative material thicknesses may be shown exaggerated, to facilitate an understanding of the invention.

BRIEF DESCRIPTION OF THE DRAWINGS

FIG. 4 is a vertical cross-sectional view of the arrangement taken generally along line 4—4, FIG. 1;

internal construction being of a flexible cellular plastic material.

DETAILED DESCRIPTION OF THE INVENTION

As required, detailed descriptions of the present invention are provided herein. In general, the detailed descriptions are to be considered as exemplary only. That is, the invention is not to be interpreted as limited to the specific construction and structures shown and described in detail, but rather the detailed descriptions provide bases for the claims and representative bases for teaching one skilled in the art the various manners in which the present invention can be employed.

THE EMBODIMENTS OF FIGS. 1-7

Figure 1:
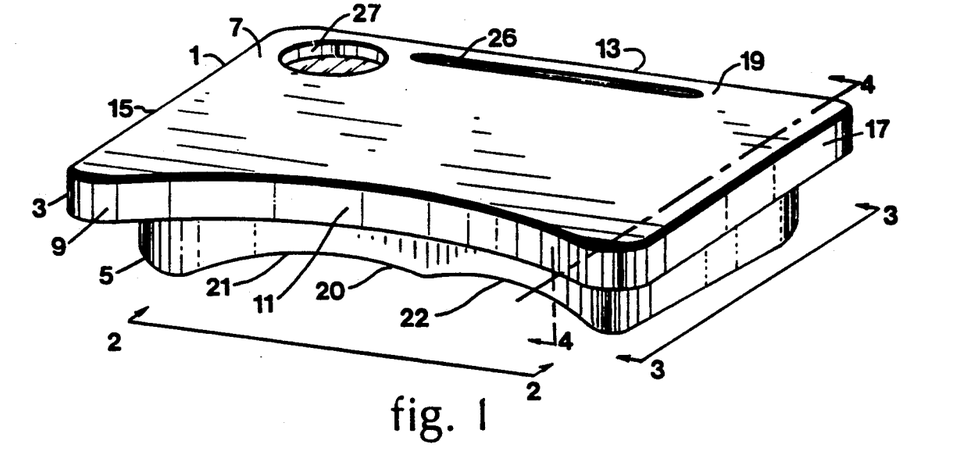
FIG. 1 is a perspective view of a compressible desk arrangement according to one embodiment of the present invention.
Figure 2:
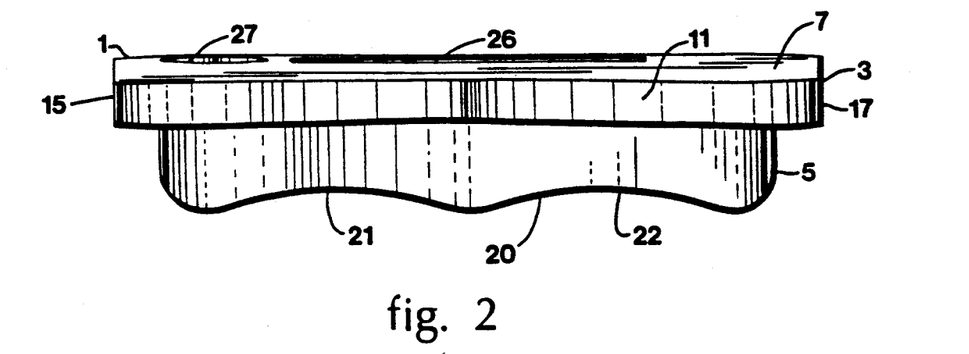
FIG. 2 is a front elevational view of the desk arrangement illustrated in FIG. 1, taken generally from the orientation of line 2—2 in FIG. 1.
Figure 3:
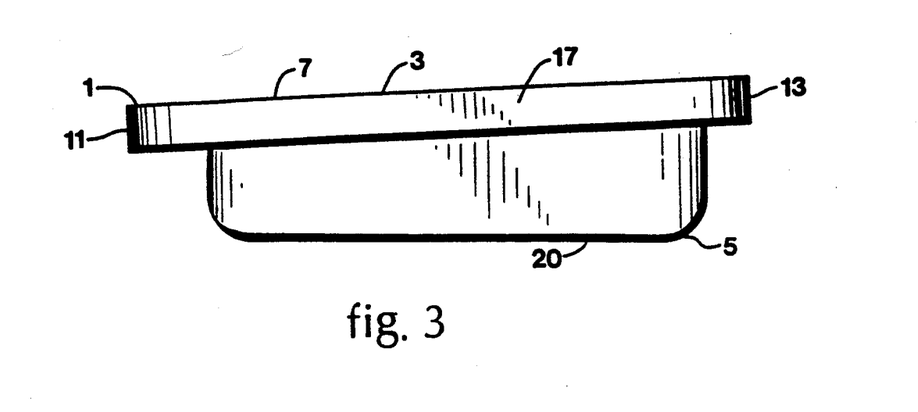
FIG. 3 is a side elevational view of the desk arrangement illustrated in FIGS. 1 and 2, taken generally from the orientation of line 3—3 in FIG. 1.

FIGS. 1-7 refer to a general type of a desk arrangement with various modifications primarily relating to construction methods. FIGS. 1-3 are illustrations of external views of this general desk arrangement. FIGS. 4-7 are illustrations of alternate internal constructions of this type of arrangement.

The reference numeral 1, FIGS. 1-4, generally designates a preferred desk arrangement according to the present invention. Desk arrangement 1 includes a top portion 3 mounted on or integrally formed with a pedestal portion 5. That is, in FIGS. 1-4 the two components are permanently affixed to one another. It will be understood that certain advantages according to the present invention may be obtained from arrangements wherein the top portion and the pedestal portion are completely separable from one another, or, for example as show below in FIGS. 8-12, from arrangements wherein they are hingedly attached to one another.

Still referring to the desk arrangement depicted by FIGS. 1-4, the top portion 3 includes an upper surface 7. Specifically referring to FIG. 1, in addition to the upper surface 7, the desk top portion 3 includes an outer periphery 9. For the embodiment shown, the outer periphery 9 generally defines a front wall 11, a back wall 13, and first and second generally opposite side walls 15 and 17. For the preferred embodiment the front wall 11 has a generally concave configuration, to substantially conform to the waist portion of a typical user. As will be understood from the following descriptions, this facilitates comfort of the user during use, and helps distribute force should a "collapsed condition" occur. For the preferred embodiment shown, FIG. 1, the upper surface 7 may be referred to herein as "generally rectangular." Preferred dimensions of the generally rectangular upper surface are about 15 to 17 inches × 13 to 15 inches × 0.5 to 1.5 inches (38 to 43 cm × 33 to 38 cm × 1 to 4 cm).

For arrangements according to the present invention, FIG. 1, the desk top portion 3 is a laterally compressible construction 19. By "laterally compressible" it is meant that the desk top portion 3 will substantially collapse under significant stress directed against the outer periphery 9 thereof. That is, a stress or force directed against at least one of the four sides of the desk top portion 3, i.e., front wall 11, back wall 13, or side walls 15 and 17, will cause it to be substantially deformed. In preferred embodiments, the desk top portion 3 is also resilient. By this it is meant that the desk top portion 3 is formed from a material which, although it will compress with respect to laterally directed stress, it will also rebound from that stress, substantially to its original configuration, once the laterally compressive stress is removed. Herein, a desk arrangement is referred to as being "resilient" if it rebounds to at least about 95% of its original size, from about a 10% compression, and preferably to greater than 99% of its original configuration. Preferably, the desk arrangement can be compressed by typically somewhat more than 10% and still rebound substantially completely.

Also, for arrangement 1 according to the present invention, the upper surface 7 of the top portion 3 is preferably adapted to support activities such as writing thereon. By this, it is meant that the upper surface 7 of the desk top portion 3 is sufficiently resistive to compression by point pressure, such that normal activities conducted on the surface of a desk can be supported thereon without a requirement for an intervening non-flexible hard surface such as a writing board or the like. Alternately stated, the desk top portion upper surface 7 is preferably adapted to sufficiently resist compression from the point pressure of a writing utensil, such as a pen or pencil, during a writing activity. That is, the desk top portion upper surface 7 is preferably adapted to sufficiently resist compression from the point pressure of a writing utensil during an activity involving placement of paper on the desk top upper surface 7 and writing on the paper without substantial intervening support structure between the desk top portion upper surface 7 and the paper. Preferably, the desk top portion 3 will also substantially compress under significant stress directed vertically against the upper surface 7. Means to facilitate appropriate adaptation of the upper surface 7 are described herein below.

In preferred embodiments, referring specifically to FIGS. 1-3, the pedestal portion 5 includes a lower surface 20 that defines first and second leg-receiving recesses 21 and 22, which generally conform to the lap of a typical user. This configuration facilitates stability and comfort of the user during use. A preferred configuration for the pedestal portion 5 is such that it supports the desk top portion 3 with the desk top upper surface 7 slanted downwardly from the back wall 13 to the front wall 11, i.e., toward the user at an angle of about 2° to 10°, as depicted in FIG. 3.

In some applications, referring to FIGS. 1 and 2, it may be desirable to provide an elongated retaining trough 26 in the desk top portion upper surface 7. Preferably the trough 26 is orientated in lateral extension between the opposite side walls 15 and 17. Thus, should an elongated writing utensil be retained within the trough 26 during an "impact condition," the utensil will be oriented such that it will not likely be projected toward a user whose body is pressed against the front wall 11. In some applications it may also be desirable to provide an annular recess, to serve as a cup or can holder 27, in the upper surface 7 of the top portion 3.

Still referring to FIGS. 1-4, preferably the pedestal portion 5 is formed of a compressible material. By this it is meant that the pedestal portion 5 comprises compressible material so that it too will collapse, under appropriate stress, during use. That is, the pedestal portion 5 will substantially collapse under significant stress directed against it. As with the desk top portion 3, in preferred embodiments the pedestal portion 5 is also resilient as defined above.

It will be understood that there is no requirement that the pedestal portion 5 be resistant to collapse under activity pressure such as writing pressure, in the same manner as the top portion upper surface 7 should be adapted to support the writing activity. Because the top portion 3 will support normal writing and drawing activities, it is sufficient that the pedestal portion 5 merely be compressible, in order to obtain the advantages of the present invention.

Figure 4:
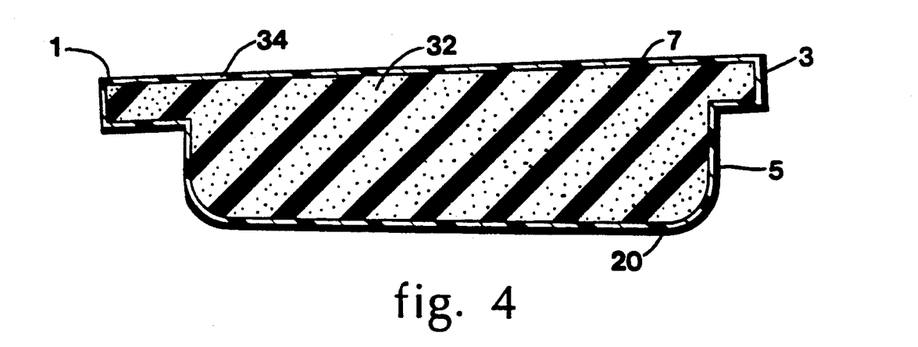

FIG. 4 shows a cross-sectional view of a first embodiment taken generally along line 4—4, FIG. 1. Referring to FIG. 4, there is depicted an internal filler material 32 with an outer skin 34. The internal filler material 32 is preferably a flexible cellular plastic material and the outer skin 34 is preferably a flexible elastomeric skin. Flexible cellular plastic materials provide desk arrangements with resiliency, which is a preferred and advantageous property. Resiliency, as above defined, allows the desk to be reusable after it has collapsed from impact.

Flexible cellular plastic materials may be generally classified as "open" cell or "closed" cell, both of which can be used in the present invention. In many embodiments closed cell material is preferred due to its relative durability and waterproofness. These qualities are particularly advantageous in the event that the outer skin 34 becomes cut, torn, or perforated. In such a situation, the internal filler material, if closed cell, is generally more durable and is less likely to be damaged. Additionally, closed cell materials are generally more resistant to puncture and also exhibit more "healing" ability pursuant to puncture than do open cell materials. Furthermore, at least in part because closed cell materials are waterproof, i.e., generally impenatrable to liquids, they are also typically easier to coat with the elastomeric coating material, which is initially liquid.

Flexible cellular plastic materials used in the present invention are preferably closed cell flexible plastic materials, such as polyethylene crosslinked foams and polypropylene crosslinked foams. Preferred closed cell materials possess a compression deflection, i.e., compression strength, within a range of about 0.2 to 35 psi (0.014 to 2.38 atm) at 25%. This is a measure of the force necessary to indent the material by about 25% of its original size at room temperature. More preferably, the compression deflection is within a range of about 1 to 10 psi (0.068 to 0.68 atm) at 25%. These ranges also appropriately characterize the preferred open cell materials. Useable materials that satisfy the above requirement are available, for example, from Uniroyal, Dow Chemical, Trocellen (South Holland, Ill.), and Voltek (Lawrence, Mass.).

The preferred outer skin 34 is a flexible elastomeric coating typically about 5 to 40 mils (0.3 to 1.0 mm) thick, and preferably about 7 to 14 mils (0.2 to 0.4 mm) thick. The preferred flexible elastomeric coating may be characterized by an elongation of about 300% to 700%, and a hardness of about 55 to 75 durometer hardness on the A scale. This coating is generally applied to all surfaces of the desk arrangement 1, but it could be limited to just the upper surface 7 if desired. Applying the coating to all outer surfaces gives the desk arrangement 1 general durability and protects the internal material 32 from damage due to abrasion, puncture, liquids, and other activities or substances. The preferred coating is also formulated to bond with the internal filler material 32 so that delamination is difficult even after compromising the coating, as for example with a knife. A preferred flexible elastomeric material, i.e., a material with properties similar to those of rubber, that may be used for the outer skin 34 is a thermoplastic resinous rubber such as that which is available from PDI, Inc. of New Brighton, Minn. and marketed under the name "Plasti Dip". This material has an elongation of about 400% to 600%, a hardness of about 65 durometer hardness on the A scale, and is characterized as having both adhesive and cohesive properties.

The coating thickness of the outer skin 34 may be varied depending upon the type of internal filler material 32 used. That is, if a flexible closed cell plastic material with a relatively low compression deflection value is used, the upper surface 7 of the desk arrangement top portion 3 may possess a thicker coating than the other surfaces, such as the lower surface 20, so as to enhance the ability of the upper surface 7 to withstand point pressure during writing activities conducted thereon.

The top portion 3 and the pedestal portion 5 may be constructed as one unit or in two distinct portions. They may be formed by a variety of methods, as for example vacuum forming, grinding, and die cutting. By constructing the two portions separately as compared to constructing the desk arrangement as one unit, manufacturing and material costs may be reduced. Furthermore, if the two portions are constructed separately, it may be desirable to use different cellular plastic materials for each. For example, the pedestal portion 5 may be comprised of a cellular material that is generally softer than the material in the top portion 3.

Figure 5:
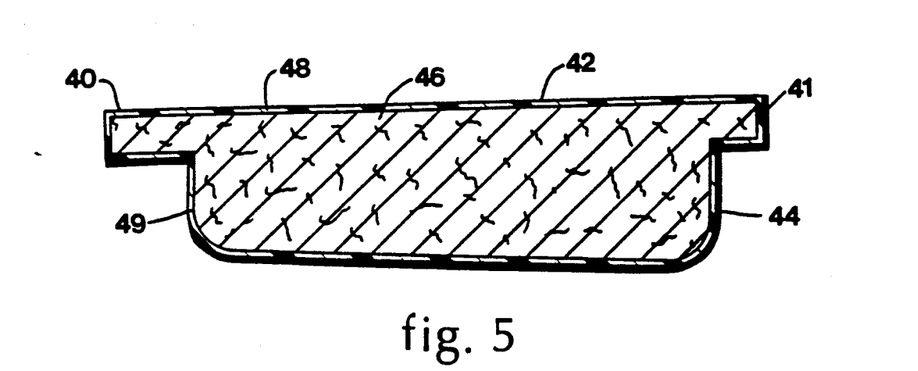
FIG. 5 is a cross-sectional view of a second embodiment taken generally along line 4—4, FIG. 1; internal construction being of a fiber material.

FIG. 5 shows a cross-sectional view of a second embodiment of a desk arrangement. The view of FIG. 5 is analogous to that of FIG. 4. Similarly to desk arrangement 1 in FIGS. 1-4, desk arrangement 40 includes a top portion 41 with an upper surface 42 and a pedestal portion 44. For the embodiment shown, there is depicted an internal filler material 46. The internal filler material 46 is preferably a fibrous material or substance. Similarly to the desk arrangement 1 shown in FIG. 4, this fibrous material, i.e., network of fibers or threads, is surrounded by an outer coating or skin 48. This outer skin 48 performs the function of providing an upper surface 42 adapted to writing thereon as well as providing a protective layer 49 for the fibrous internal filler material 46.

The fibrous internal filler material 46 may be a network of fiberglass or fabric such as felt or wool. Materials that are typically relatively hard, such as fiberglass, may be used if they are oriented in an open, or "airy," network arrangement such that the compressibility of the overall material is effectively increased. This type of desk arrangement 40 with a construction that uses an open network of a fibrous material would typically allow writing thereon but would collapse in the event of an impact. These materials are not necessarily resilient, or as resilient as the flexible cellular plastic materials described above. Therefore, the desk arrangements would typically be irreparably damaged should an impact collapse them, although they would be advantageously compressible.

As in the embodiment described above, the outer skin 48, may be formed from a thermoplastic resinous rubber, or the like, that exhibits resilient tendencies capable of supporting writing activities on the upper surface 42, yet flexible enough to allow the fibrous internal filler material 46 to collapse upon impact.

Figure 6:
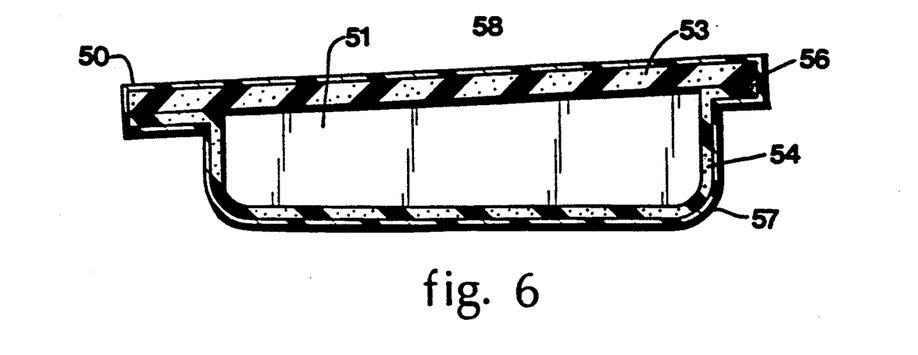
FIG. 6 is a view similar to FIG. 4 of an alternate (third) embodiment with the desk arrangement provided with an internal cavity.

FIG. 6 shows a cross-sectional view similar to those shown in FIGS. 4 and 5, but of an alternate embodiment, i.e., desk arrangement 50, that has an internal cavity 51. That is, the desk arrangement 50 depicted is hollow, i.e., with an internal cavity. The internal cavity 51 provides an advantageous desk arrangement 50 because of reduced material requirements. Also, the incorporation of the internal cavity 51 results in a relatively lightweight desk arrangement 50 with enhanced compressibility. The internal cavity 51 may be provided as a result of a preferred manufacturing method. This preferred manufacturing method involves the formation of the internal material of the desk arrangement into two separate components, an upper component 53 and a lower component 54.

The lower component 54 is formed into a preferred shape using typical vacuum forming techniques. By vacuum forming the lower component 54, a number of advantages are realized. As stated above, the desk arrangement 50 that results is lightweight because of reduced material, which also results in reduced costs. Vacuum forming also reduces waste of materials, which is otherwise normally experienced during the trimming and cutting activities, and achieves a smoother appearance of rounded corners more readily.

Using vacuum forming techniques to produce a desk arrangement 50 with an internal cavity 51 also allows for the use of a cellular material with a higher compression deflection, i.e., compression strength, as compared to a "solid" desk arrangement. The use of a higher compression deflection material enhances the resistance to point pressure during writing activities, without diminishing the overall compressible characteristics of the assembly. Having a cavity allows a further state of collapse due to the compressibility of the air contained therein.

Preferred embodiments of a desk arrangement with an internal cavity have a hollow volume that is between about 25% and 75% of the total volume of the desk arrangement. More preferred embodiments have a hollow volume that is about 50% to 70% of the total volume of the desk arrangement. In this type of arrangement, because of the added strength resulting from the coating material, the walls of both the upper and lower components may be made relatively thin to further result in a reduction in weight and a reduction in material cost. A preferred thickness of the cellular plastic material is within the range of about ⅛ inch to ¾ inch (0.32 to 1.9 cm), and more preferably within the range of about ¼ inch to ⅜ inch (0.64 to 0.77 cm).

Although not depicted in FIG. 6, advantage may be realized by the supplemental use of an internal support structure, also of compressible material, placed generally in the center of the cavity, if the walls of the desk arrangement are relatively thin.

The upper component 53 and the lower component 54 may be joined, thereby forming a top portion 56 and a pedestal portion 57, using an appropriate adhesive. Preferably, however, they are joined using a thermal bonding technique, which generally avoids the use of adhesives. This technique produces a bond strength generally equivalent to the inherent strength of the material. It is noted that a portion of the lower component 54 may form a part of the desk top portion 56. Once the two components are joined the entire assembly is coated with outer skin 58 using the materials previously described, e.g., a flexible elastomeric material such as a thermoplastic resinous rubber.

Figure 7:
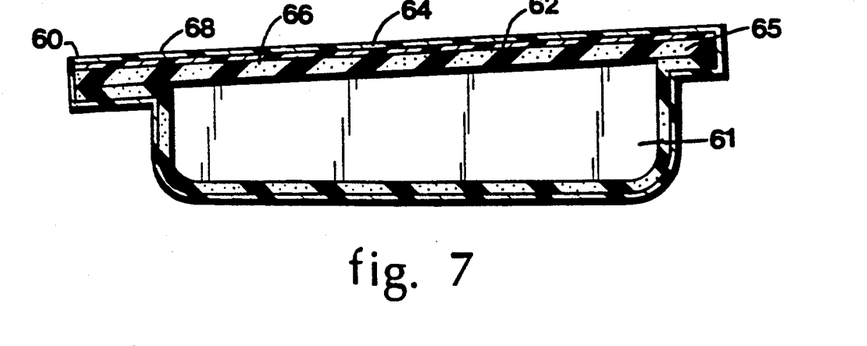
FIG. 7 is a view similar to FIG. 6 of an alternate (fourth) embodiment with the desk provided with a thin film of a relatively high density flexible plastic material positioned between inner flexible cellular plastic material and outer coating.

FIG. 7 shows a cross-sectional view of a desk arrangement 60 with a cavity 61 analogous to the view shown in FIG. 6 but with the inclusion of a thin film of a flexible and relatively high density plastic film 62, as for example MYLAR TM, positioned between a flexible elastomeric skin 64 and an internal filler material 65 of the upper component 66. In the desk arrangement 60 the internal filler material 65 is composed of a flexible cellular plastic material, preferably a closed cell material. The thin relatively high density flexible plastic film 62 preferably possesses an elongation of 100% to 400% and an ultimate strength of about 24,000 to 30,000 psi (1,633 to 2,041 atm). It performs a number of functions and may be within the range of 1 to 20 mils (0.025 to 0.5 mm) thick, preferably within the range of about 3 to 9 mils (0.08 to 0.2 mm) thick. The addition of this material reduces the thickness requirements of the elastomeric skin 64 necessary to obtain a desirable desk top upper surface 68, thereby reducing material costs. The plastic film 62 offers advantageous resistance to point pressure resulting from the force of a pen or pencil point, while due to its thinness and flexibility still generally allows for substantial compressibility in the lateral direction. Therefore, the internal filler material 65 may be less resistant to point pressure.

Furthermore, the plastic film 62 is more resistant to elongation than the cellular material or coating which advantageously produces an effect to the desk top upper surface 68 that more readily supports writing activities. That is, the plastic film 62 provides support to the desk top upper surface 68 without reducing the overall compressibility of the arrangement 60. This allows for the production of a desk arrangement with thinner walls and less coating thickness. The plastic film 62 may be located in the central writing area of the upper surface 68 or it may be extended out to all, or select, edges. Alternately, there are some cellular materials available with a thin higher density plastic layer pre-applied. The use of this type of cellular material provides advantage with respect to manufacturing because the steps of positioning and affixing the plastic sheet are eliminated. If a cellular material with a pre-applied plastic is used, an embodiment is possible wherein the entire outer surface of the desk arrangement, including the desk top portion and the pedestal portion, is covered with the thin plastic layer under the flexible elastomeric coating.

THE EMBODIMENTS OF FIGS. 8-12

FIGS. 8-12 generally display desk arrangements, each with an internal cavity, i.e., a storage recess or compartment, analogous to that shown in FIGS. 6 and 7. Each arrangement has a desk top portion hingedly secured, i.e., attached, to a pedestal portion. Furthermore, the desk top portion has open and closed orientations thereby permitting access to the storage recess.

Figure 8:
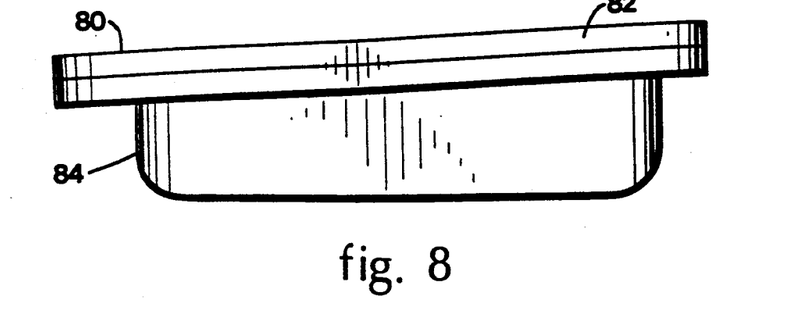
FIG. 8 is a side elevational view analogous to that of FIG. 3, but of an alternate (fifth) embodiment with an internal cavity, and with a desk top portion hingedly secured to a pedestal portion and depicted in a closed orientation.
Figure 9:
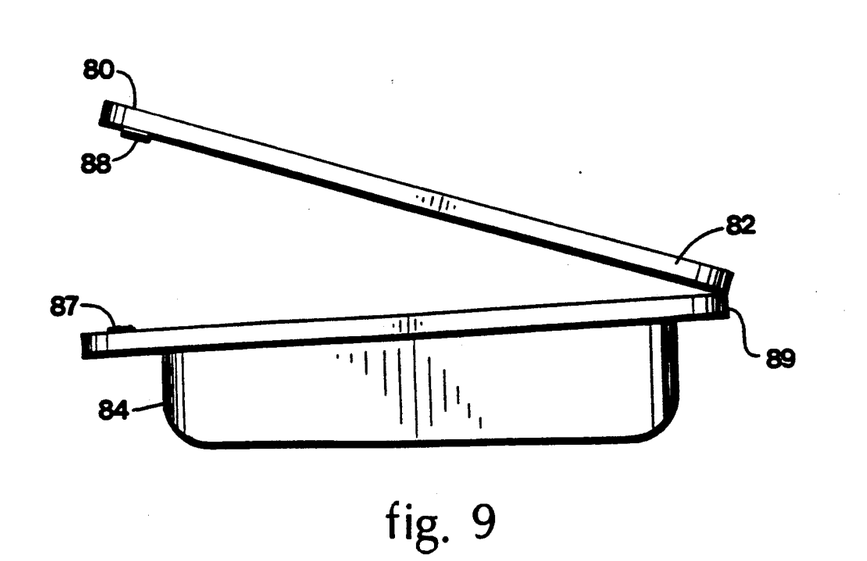
FIG. 9 is a side elevational view of the embodiment shown in FIG. 8, with a desk top portion hingedly secured to a pedestal portion depicted in an open orientation.
Figure 10:
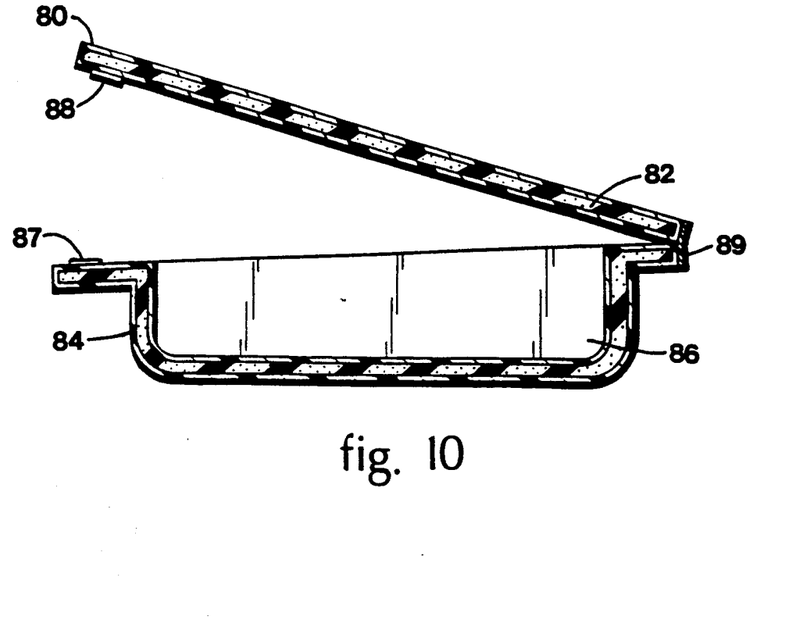
FIG. 10 is a cross-sectional view analogous to that shown in FIG. 4 (i.e., taken generally along an analogous line to 4—4) but of the embodiment depicted in FIGS. 8 and 9 and with a desk top portion hingedly secured to a pedestal portion and depicted open.

FIG. 8 is a side elevational view of a thus described desk arrangement 80, generally depicted in FIGS. 8-10. FIG. 8 shows a desk top portion 82 hingedly attached, and in a closed orientation, to a pedestal portion 84. The desk top portion 82 may alternately be constructed and arranged to be fully removable from the pedestal portion 84. Whether the desk top portion 82 is fully removable or hingedly secured, the desk arrangement 80 allows access to an internal cavity 86 (FIG. 10), which provides many useful advantages. For example, extra storage space is provided. Because the desk can be used in traveling situations it is convenient to have ready access to a storage area.

FIG. 9 depicts a side elevational view of the desk arrangement 80 shown in FIG. 8 with the desk top portion 82 hingedly secured and open, allowing access to the internal cavity 86 (FIG. 10). During the "open" orientation of the desk arrangement 80, both the desk top portion 82 and the pedestal portion 84 retain their compressible nature.

Any of a variety of closure means can be used to selectively retain the top portion 82 closed (FIG. 8). A preferred closure means is hook and loop fasteners, depicted by reference numbers 87 and 88 (FIG. 9) such as VELCRO TM. VELCRO TM fasteners can be produced in a flexible configuration, e.g., using flexible backing material. An attachment means, such as a hinge 89, can also be configured such that compressibilty in the attachment means is maintained. For example, plastic film hinges offer low maintenance and low cost. They are also quite compatible with most coating processes associated with thermoplastic resinous rubber coatings. It is understood that although the hinge 89 is shown on the back wall of the desk arrangement, it may be attached elsewhere, for example to one of the side walls if so desired.

FIG. 10 shows the desk arrangement 80 with the top portion 82 hingedly attached and all outer (i.e., exposed when open) surfaces coated, both externally and internally, with an outer skin composed of a flexible elastomeric material as described above. This gives added stability and offers the advantages associated with the coating as discussed above. These typically include durability and ease of clean up and protection for the cellular material.

Figure 11:
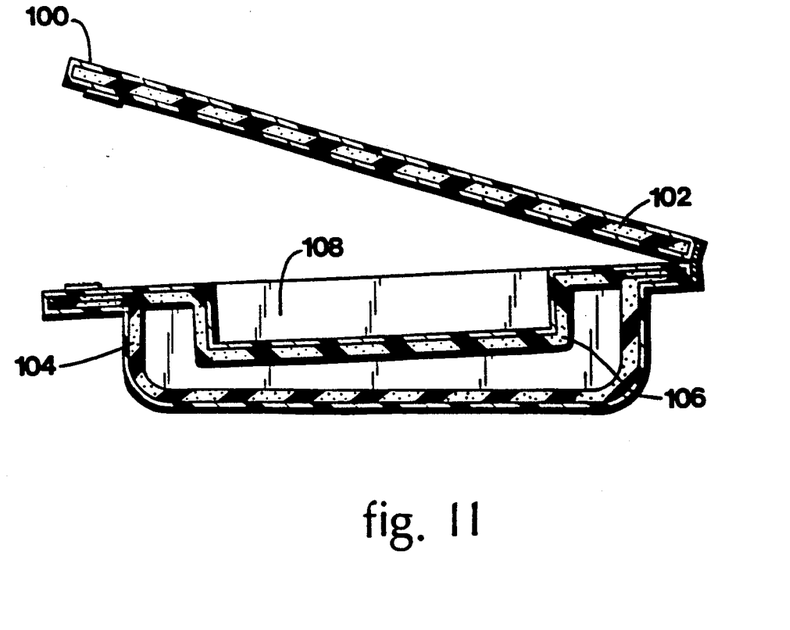
FIG. 11 is a cross-sectional view similar to FIG. 10 of an alternate (sixth) embodiment with a desk top portion hingedly secured and with the inclusion of an alternate embodiment of a storage recess.
Figure 12:
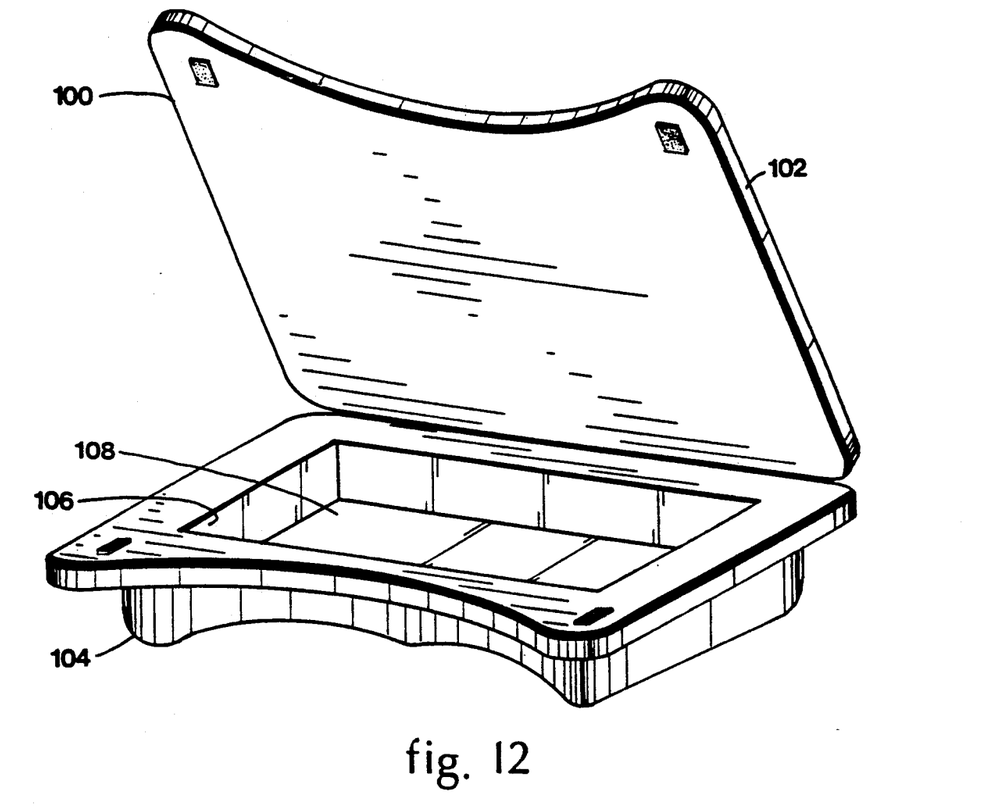
FIG. 12 is a perspective view of the embodiment of the compressible desk arrangement shown in FIG. 11 with a desk top portion hingedly secured to a pedestal portion and depicted open.

FIGS. 11 and 12 show a desk arrangement 100 with a top portion 102 hingedly secured to a pedestal portion 104 with the inclusion of an alternate embodiment of a storage compartment, i.e., a more uniform internal storage recess. The desk arrangement 80 depicted in FIGS. 8-10 contains an internal cavity 86, i.e., storage recess, that is defined by the pedestal portion 84. Thus, the shape of the internal cavity 86 is restricted by the outer geometry of the pedestal portion 84. The desk arrangement 100 in FIGS. 11 and 12 contains an additional internal component 106 of a flexible cellular plastic material. The use of an additional internal component 106 creates a more uniform internal storage recess 108. Furthermore, this structure also adds support to the pedestal portion 104, for example, when the top portion 102 is open. A similar effect could be achieved with the pedestal portion constructed from a solid piece of material, typically cellular foam, which is trimmed to achieve the desired configuration.

THE EMBODIMENTS OF FIGS. 13-16

FIGS. 13-16 generally depict desk arrangements that are inflatable. The embodiments shown basically vary with respect to the treatment of the outer surface. That is, an inflatable desk comprised of an internal flexible cellular plastic material may have just a flexible cellular plastic coating or it may have just a covering of a pretreated fabric (i.e., pretreated such that it is airtight). An alternate embodiment of an inflatable desk may be completely covered with an untreated fabric and an additional coating of a flexible elastomeric material for imparting a generally airtight and waterproof covering. A thin film of a relatively high density flexible plastic material may also be used on the upper surface of an inflatable desk arrangement for added advantage with respect to the writing surface.

Figure 13:
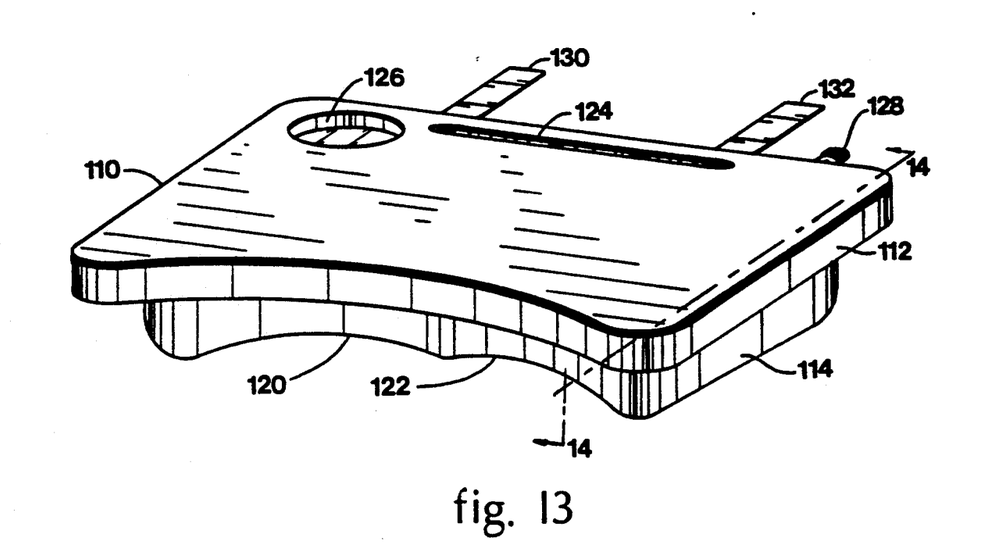
FIG. 13 is a perspective view of an alternate (seventh) embodiment depicting an inflatable lap desk arrangement.
Figure 14:
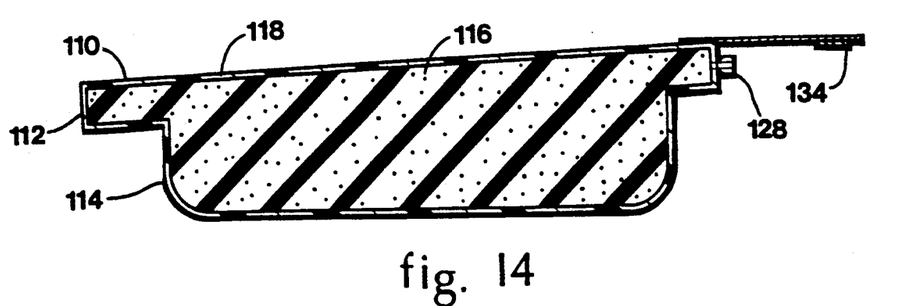
FIG. 14 is a cross-sectional view taken generally along line 14—14, FIG. 13; internal construction being of an open cell flexible plastic material with a coating of a fabric.

FIG. 13 shows a front view of an inflatable desk arrangement 110. FIG. 14 shows a cross-sectional view of the inflatable desk arrangement 110 taken generally along line 14—14 in FIG. 13. The inflatable desk arrangement 110 possesses the advantages of compressibility and resilience plus the added benefit of compact storage.

The desk arrangement 110 comprises an inflatable top portion 112 attached to a pedestal portion 114, which is also preferably and advantageously inflatable. As with the above-described desk arrangements, it is possible to manufacture the inflatable desk arrangement 110 either in separate portions or as one integral piece. FIG. 14 depicts the desk arrangement 110 with internal filler material 116 and an outer coating 118 of a pretreated fabric.

The pretreated fabric encompassing the internal material provides a relatively airtight seal. A "pretreated fabric", i.e., coated fabric, is a construction comprising a combination of a textile and a polymer. The textile component may be a woven, nonwoven, or knitted textile of a natural and/or man-made material, such as for example nylon or polyester/cotton. The polymer component may be a rubber or synthetic elastomer, such as for example, polyurethane or polychloroprene. A typical, and preferred pretreated fabric, is urethane-coated nylon. Nylon is preferred because it is generally very durable yet flexible, and the urethane gives the fabric an airtight nature. The nylon weave also provides the assembly with a form-holding characteristic.

Although, the fabric is typically pretreated, there is no requirement that this be so. If a desk arrangement is covered with an untreated fabric, as for example untreated nylon, it may be coated with a flexible elastomeric skin for providing an enhanced airtight arrangement. Using a combination of an untreated fabric and a flexible elastomeric skin in certain circumstances is advantageous due to a reduction in the amount of elastomeric material required to impart the functional characteristics to the writing surface of the desk arrangement.

Preferably, the internal filler material 116 is an open cell flexible cellular plastic material. Referring to FIG. 13, the internal material 116 is typically cut to the shape of the desk top portion 112 and the pedestal portion 114 and preferably including leg recesses 120 and 122. The desk arrangement may also include an elongated retaining trough 124 and an annular receptacle 126. The retaining trough 124 and the annular receptacle 126 may be produced by cutting the internal material or, alternately, by the addition of a prefabricated plastic trough or receptacle of a relatively higher density plastic, such as MYLAR TM. This trough and receptacle would retain its shape to provide a functional depression yet be flexible so as to not deter from the compressibility of the desk arrangement.

The inflatable desk arrangement 110 includes means for inflating and deflating the desk, as exemplified by valve 128. Any such means that allows for entry and exit of air may be used. Typical mechanisms useful in the present invention are simple "turn-to-open" plastic valves, i.e., ones in which a rotation of the valve to an open position allows air to pass through. Such valves are generally easy to operate, not prone to disassembly, and generally present no sharp points or edges. When the valve is open, air is allowed to enter and inflate the desk arrangement. Once inflated with the valve closed, the desk arrangement supports writing activities, and the like.

The internal material useable for the inflatable desk arrangements is preferably flexible open cell plastic material, e.g., open cell foam, that is resilient, as defined above. Preferred flexible, resilient, open cell plastic materials generally possess a compression deflection within a range of about 0.2 to 35 psi (0.014 to 2.38 atm) at 25% at room temperature. More preferably, the compression deflection of the open cell foam is within a range of about 1 to 10 psi (0.068 to 0.68 atm) at 25%. Most preferably, the compression deflection of the open cell foam for the inflatable desk arrangements is within a range of about 1 to 3 psi (0.068 to 0.20 atm) at 25% at room temperature. Certain of the above-described open cell foams have sufficient resiliency to give the desk a generally rapid self-inflating characteristic under normal atmospheric pressure. Partial inflation can normally be achieved in a few minutes, with full inflation possible within about 5 minutes.

A preferred embodiment of this inflatable desk arrangement also includes means for restraining the desk arrangement 110 in a deflated and typically rolled-up orientation for easy transport. Typically the restraining means is a pair of flexible storage straps 130 and 132. The storage straps 130 and 132 typically also have fastening material 134 (FIG. 14), such as VELCRO TM, attached thereto.

Figure 15:
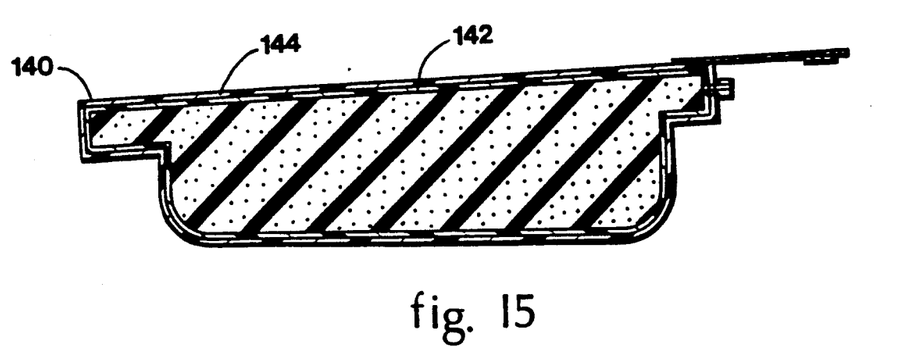
FIG. 15 is a view of an alternate (eighth) embodiment analogous to that shown in FIG. 14 but including an exterior coating.

FIG. 15 is a cross-sectional view of an alternate embodiment of the inflatable desk arrangement 110 shown in FIG. 14. Desk arrangement 140 includes an outer coating 142 of a fabric, analogous to that shown in FIG. 14, and an exterior coating 144 of a flexible elastomeric skin. The flexible elastomeric skin is preferably a thermoplastic resinous rubber as described above. The coating provides the same advantages as discussed above with respect to enhancing the functional characteristics of the desk arrangement. Also, it provides a smoother writing surface than the fabric with increased durability and improved and easier cleaning. Partial coverage with the coating material is also within the scope of the invention. For example, the upper surface may be the only surface coated. Although, this embodiment shows the desk arrangement completely coated, the upper surface may by the only surface that is coated with the elastomeric skin.

Figure 16:
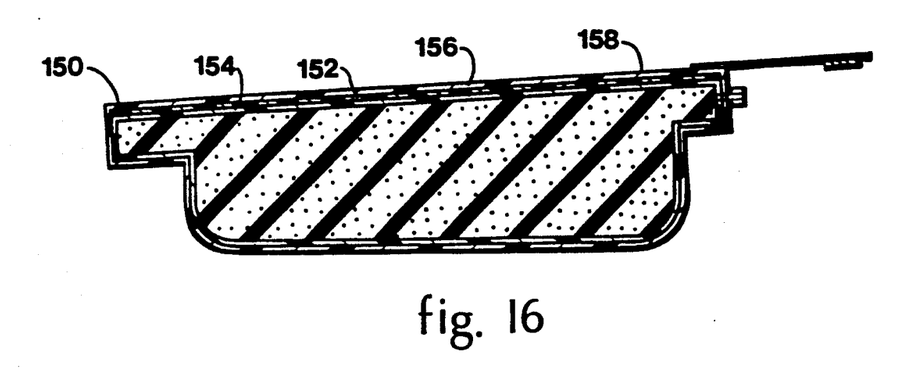
FIG. 16 is a view of an alternate (ninth) embodiment, analogous to that shown in FIGS. 14 and 15, with a relatively high density flexible plastic film positioned between fabric and outer coating.

FIG. 16 is a cross-sectional view of an alternate embodiment, i.e., desk arrangement 150, analogous to that shown in FIGS. 14 and 15, with a relatively high density flexible plastic film 152 positioned between and outer fabric coating 154 and an exterior coating 156. This arrangement has the same advantages as previously discussed. The plastic film 152 reduces the need for a thicker build-up of the coating on a desk top upper surface 158 to produce a more preferred writing surface. The film also has an effect that assists in holding the surface flat for writing yet still allows lateral compressibility due to its thinness and flexibility. The film can be centered on only a small portion of the desk top upper surface 158, or it can be extended to any or all of the edges, as is shown in FIG. 16.

For the inflatable desk arrangements herein described, various internal materials may be combined to produce different desk top and pedestal portion characteristics. These materials would preferably still involve open cell foams, however, because of the advantageous self-inflating capability of these materials.

The invention has been described with reference to various specific and preferred embodiments. It should be understood, however, that many variations and modifications may be made while remaining within the spirit and scope of the invention.

What is claimed and designed to be secured by Letters Patent is as follows:

1. A lap desk comprising:
(a) a laterally compressible, resilient, desk top portion comprising a front wall, an opposite back wall, first and second generally opposite side walls, and an upper surface, wherein:
  (i) said desk top portion, including said upper surface, comprising a flexible cellular plastic material having a compression deflection value within a range of about 0.2 to 35 psi at 25%;
  (ii) said desk top portion, including said upper surface, being capable of compressing under a stress directed against at least one of said front or back walls, and subsequently rebounding, after said stress is removed, to at least about 95% of its original size from at least about a 10% compression of its length between said front and back walls; and
  (iii) said desk top portion, including said upper surface, being coated with a flexible elastomeric skin such that the upper surface is sufficiently adapted to support writing activity thereon; and (b) a compressible, resilient, pedestal portion attached to said desk top portion to form a lap desk; said pedestal portion being coated with a flexible elastomeric skin.

2. The lap desk according to claim 1 wherein said flexible elastomeric skin is a thermoplastic resinous rubber of about 5 to 40 mils thick.

3. The lap desk according to claim 1 wherein said coated upper surface has a relatively high density flexible plastic film of about 1 to 20 mils thick.

4. The lap desk according to claim 1 wherein said cellular plastic material comprises a closed cell material.

5. The lap desk according to claim 1 wherein said cellular plastic material comprises an open cell material.

6. The lap desk according to claim 1 wherein said desk top portion includes an elongated retaining trough and an annular receptacle therein.

7. The lap desk according to claim 1 wherein said desk top portion front wall is generally concave.

8. The lap desk according to claim 1 wherein said pedestal portion includes a lower surface defining first and second, concave, leg-receiving recesses.

9. The lap desk according to claim 1 wherein said lap desk contains an internal cavity.

10. A lap desk comprising:
(a) a compressible, resilient, pedestal portion defining a storage recess; said pedestal portion being coated with a flexible elastomeric skin; and
(b) a laterally compressible, resilient, desk top portion attached to said pedestal portion to form a lap desk; said desk top portion comprising a front wall, an opposite back wall, first and second generally opposite side walls, and an upper surface, wherein:
(i) said desk top portion, including said upper surface, comprising a flexible cellular plastic material having a compression deflection value within a range of about 0.2 to 35 psi at 25%;
(ii) said desk top portion, including said upper surface, being capable of compressing under a stress directed against at least one of said front or back walls, and subsequently rebounding, after the stress is removed, to at least about 95% of its original size from at least about a 10% compression of its length between said front and back walls; and
(iii) said desk top portion, including said upper surface, being coated with a flexible elastomeric skin such that the upper surface is sufficiently adapted to support writing activity thereon; and
(c) an open and a closed orientation to said lap desk wherein:
(i) said desk top portion, when in said closed orientation, being oriented to close said pedestal portion storage recess; and
(ii) said desk top portion, when in said open orientation, being oriented to permit access to said pedestal portion storage recess.

11. The lap desk according to claim 10 wherein said desk top portion is hingedly secured to said pedestal portion.

12. The lap desk according to claim 10 wherein said desk top portion is secured to said pedestal portion with a hook and loop fastener arrangement.

13. The lap desk according to claim 10 wherein said pedestal portion includes a lower surface defining first and second, concave, leg-receiving recesses.

14. The lap desk according to claim 10 wherein said pedestal portion is constructed and arranged to operatively support said desk top portion with said desk top upper surface slanted downwardly from said back wall to said front wall.

* * * * *